Aug. 28, 1928.  
G. W. MERRITT  
1,682,718  
COMBINATION AUTOMATIC CAR FEEDING AND STOPPING MECHANISM  
Filed Oct. 18, 1926  
6 Sheets-Sheet 1
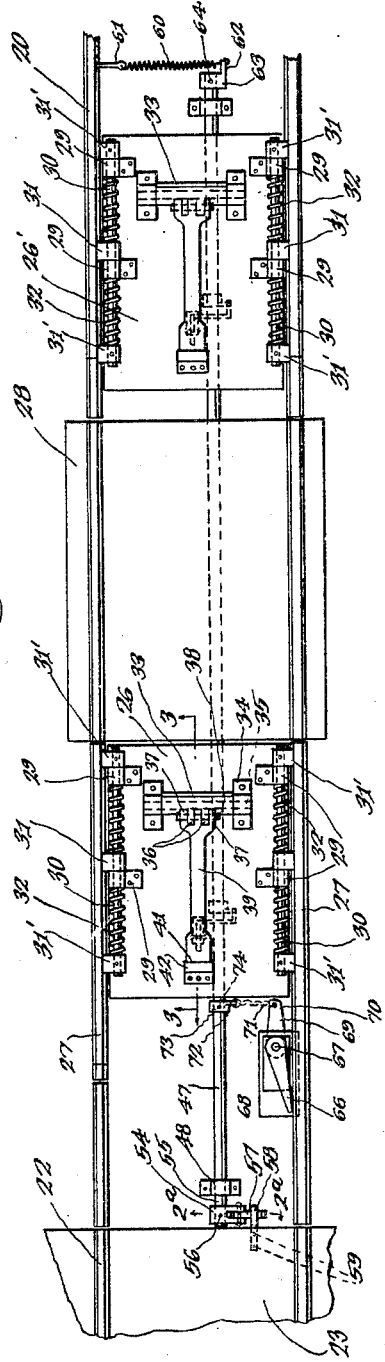
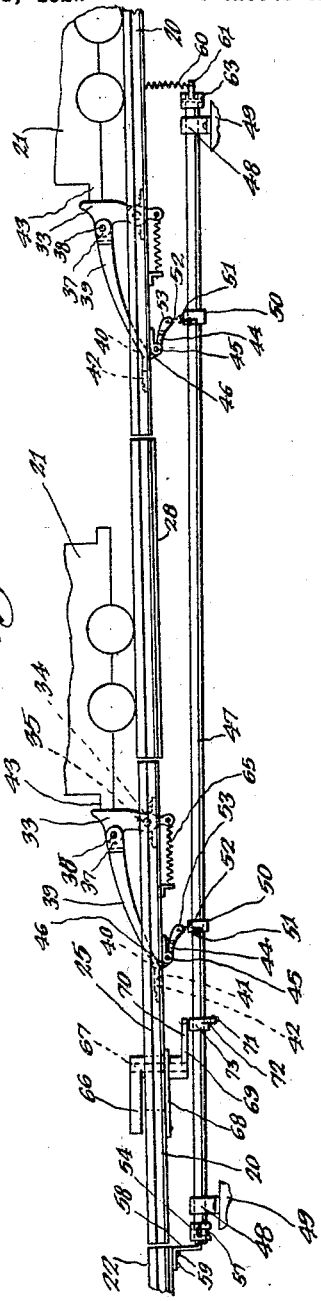
Glenn W. Merritt
INVENTOR
BY Victor J. Evans
ATTORNEY Aug. 28, 1928.  1,682,718
G. W. MERRITT
COMBINATION AUTOMATIC CAR FEEDING AND STOPPING MECHANISM
Filed Oct. 18, 1926 6 Sheets-Sheet 2
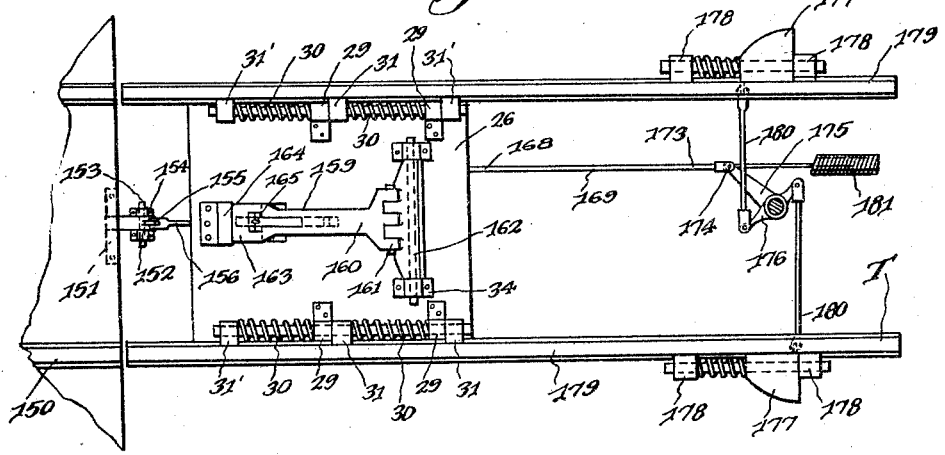
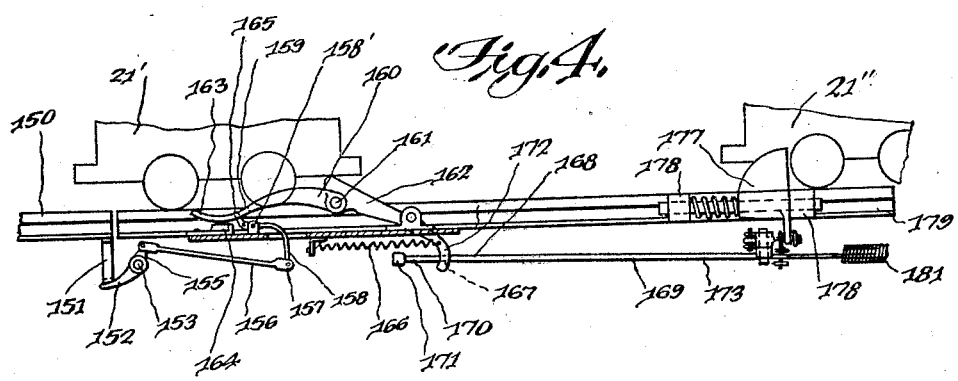
Glenn W. Merritt
INVENTOR
BY Victor J. Evans
ATTORNEY Aug. 28, 1928.                                                                    1,682,718
G. W. MERRITT
COMBINATION AUTOMATIC CAR FEEDING AND STOPPING MECHANISM
Filed Oct. 18, 1926          6 Sheets-Sheet 3

Glenn W. Merritt
INVENTOR

BY Victor J. Evans
ATTORNEY

Aug. 28, 1928.　　　　　　　　　　　　　　1,682,718
G. W. MERRITT
COMBINATION AUTOMATIC CAR FEEDING AND STOPPING MECHANISM
Filed Oct. 18, 1926　　　6 Sheets-Sheet 4

Glenn W. Merritt
INVENTOR

BY Victor J. Evans
ATTORNEY

Aug. 28, 1928.  
G. W. MERRITT  
1,682,718  
COMBINATION AUTOMATIC CAR FEEDING AND STOPPING MECHANISM  
Filed Oct. 18, 1926  6 Sheets-Sheet 5
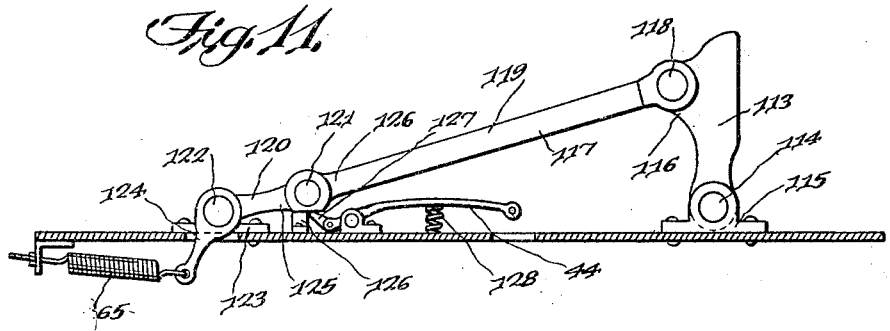

Aug. 28, 1928.  
G. W. MERRITT  
1,682,718  
COMBINATION AUTOMATIC CAR FEEDING AND STOPPING MECHANISM  
Filed Oct. 18, 1926     6 Sheets-Sheet 6
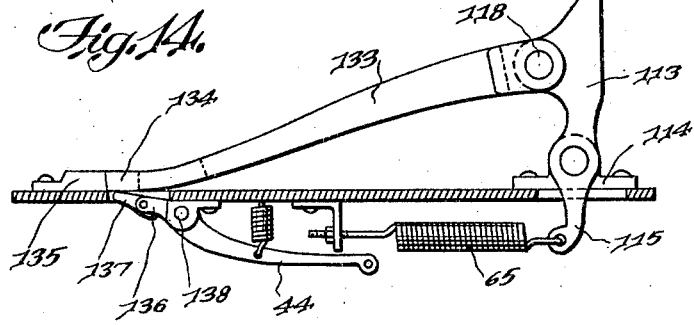
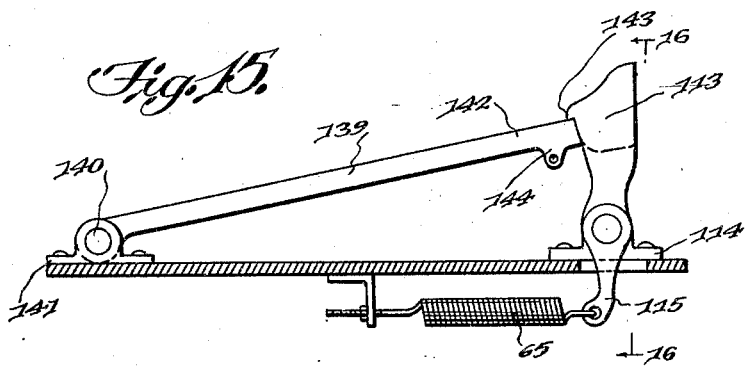
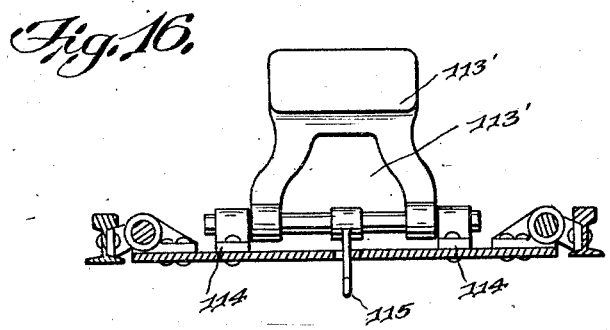
Glenn W. Merritt INVENTOR
BY Victor J. Evans ATTORNEY Patented Aug. 28, 1928.

1,682,718

UNITED STATES PATENT OFFICE.

GLENN W. MERRITT, OF BOWERSTON, OHIO.

COMBINATION AUTOMATIC CAR FEEDING AND STOPPING MECHANISM.

Application filed October 18, 1926. Serial No. 142,476.

This invention relates to certain novel improvements in combination automatic car feeding and stopping mechanism and has for its principal object the provision of an improved construction of this character which will be highly efficient in use and economical in manufacture.

Among the salient objects of this invention is the provision for automatically controlling the starting of and passage of mining cars from one point to another and from a track to a hoisting cage or dump or scale or, in fact, from any point of delivery of the cars on the track whereby the starting of each successive car being dependent upon the automatic operation of the device brought into play when the preceding car has reached a point for transfer onto the cage or to the dump or has proceeded so far on its way that the succeeding car of the cars will be automatically stopped.

Generally expressed, the purpose of the invention is to provide a simple combination and arrangement of parts functioning to keep the cars of the series following each other on the same track or to the same point properly arranged for transmission from the track to the cage or on the dump thus providing an orderly operation of the mine delivery.

Another object of the invention is the provision for automatically permitting successive movement of mining cars or the like along a track to a point for delivery upon the cage or the dump and whereby the cars will be simultaneously released for movement along the track by operation of mechanism, hereinafter described, controlled by the cage or dump.

A still further object of the invention is to provide a device of this character which, when operating upon mining cars, will not damage or otherwise deteriorate the same.

A still further object of the invention is the provision of a device of this character which not only automatically controls successive movement of mining cars but also provides cushioning mechanism therefor.

Other objects will appear hereinafter.

The invention consists in the combination and arrangement of parts to be hereinafter described and claimed.

The invention will be best understood by reference to the accompanying drawings illustrating the preferred form of construction of my invention, and in which:

Fig. 1 is a plan view of mechanism constructed in accordance with my invention.

Fig. 2 is a side elevational view of the same.

Fig. 2ª is a detail view of a latch employed in the device.

Fig. 3 is a plan view similar to Fig. 1 showing a slightly modified form of construction.

Fig. 4 is a side elevational view of the same.

Figure 5:
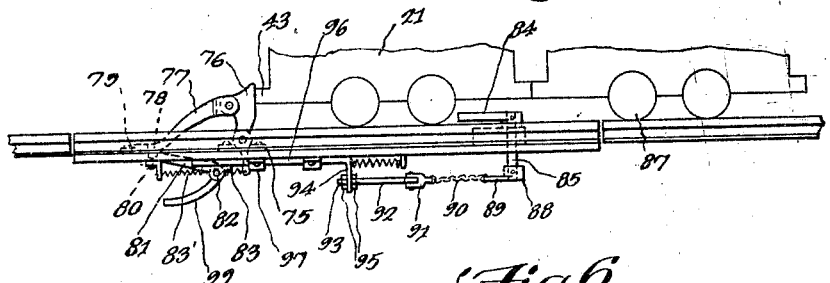
Figure 6:
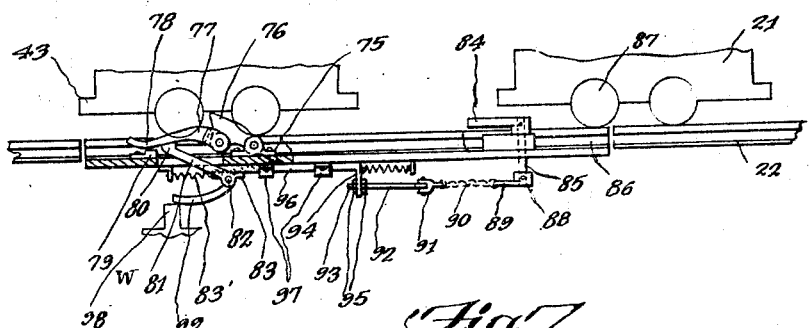
Figure 7:
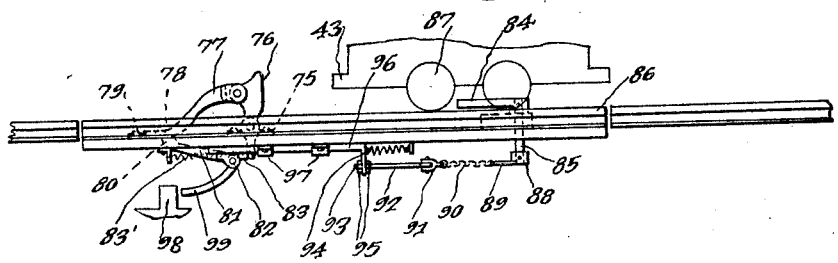

Figs. 5 to 7 inclusive are detail views of the automatic control mechanism, embodied in the invention showing the control mechanism associated with a cage.

Figure 8:
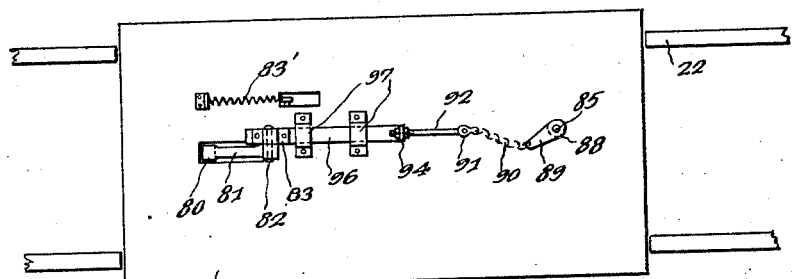

Fig. 8 is a plan view looking upwardly toward the bottom of the cage illustrated in Figs. 6 to 8 inclusive.

Figure 9:
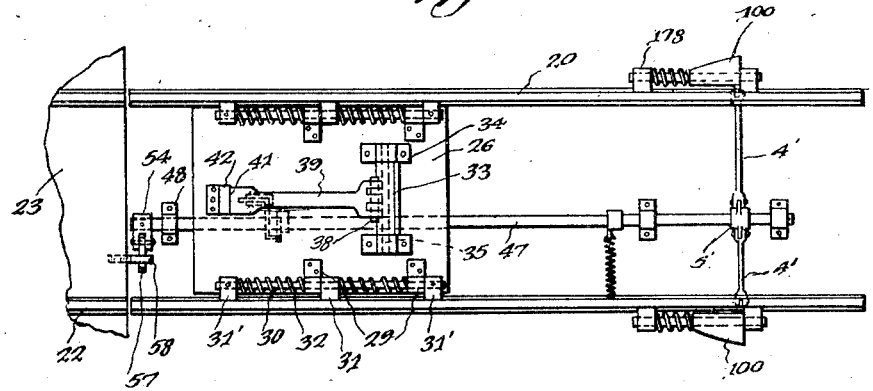

Fig. 9 is a plan view of a modified form of construction over that illustrated in Fig. 1.

Figure 10:
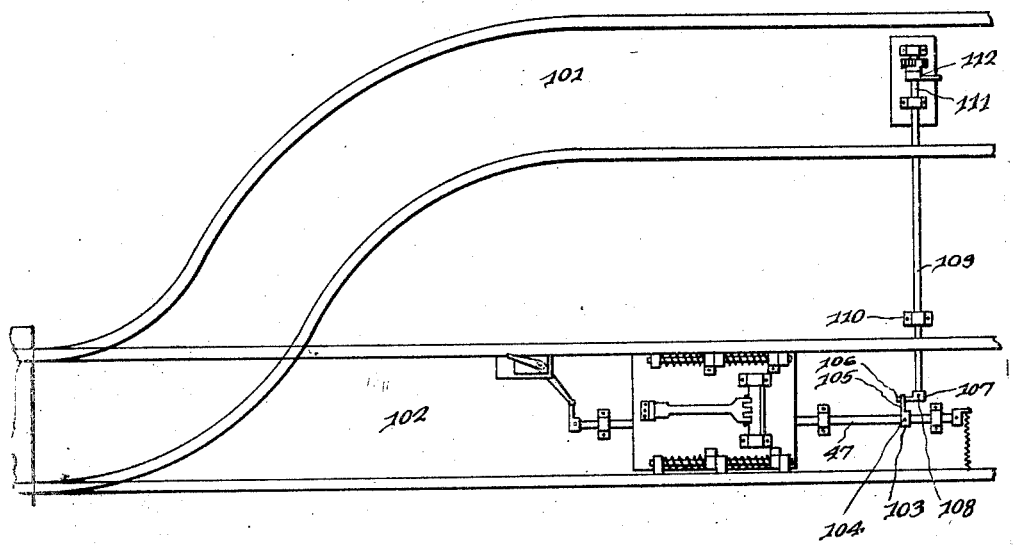

Fig. 10 is a plan view showing the control mechanism associated with what is known in the art as a kickback dump.

Figs. 11 to 15 inclusive are detailed modified forms of stop mechanism as illustrated in Fig. 3.

Fig. 16 is a sectional detail view taken substantially on line 16—16 of Fig. 15.

In mining operations it is the ordinary practice to provide a trackway or series of trackways along and over which cars are adapted to pass for transmission onto a cage or to dumping mechanism. As it is the custom to attempt to provide rapid successive movements of the cars it is necessary to provide mechanism which will control the successive movements of the cars without damage to the same and at the same time prevent interference with the rapid successive movement.

It is, therefore, one of the many objects of this invention to provide mechanism which will be automatically operated by a cage for controlling successive movement of the cars and in this connection I have illustrated in Figs. 1 and 2 a trackway 20 along which the mining cars 21 are moved for positioning upon the trackway 22 of the cage 23. This trackway 22 at its end portion toward the cage 23 is slightly inclined as at 25 whereby when the cars 21 are automatically released they will move by gravity onto the cage 23.

The mechanism illustrated in Figs. 1 and 2 for controlling the movement of the cars 21 includes plates 26 and 26' arranged between the rails 27 of the trackway 20, the plate 26' being positioned forwardly of a scale platform 28 whereas the plate 26 is disposed between the scale platform 28 and the cage 23.

Each of the plates 26 and 26' defines bearings 29 which slidably receive rods 30. The rods 30 are slidably carried by bearings 31 connected in a suitable manner to the trackway 20 and the end portions of these rods are fixed to bearings 31' likewise secured in any suitable manner to the trackway 20. Embracing these rods and disposed between the bearings 29 and 31' and the bearings 29 and 31 are cushioning springs 32. The construction is such that upon movement of the plates 26 the cushioning springs 32 will tend to resist movement of the plate 26 and thereby relieve the strain on the cars which engage stop latches 33. These stop latches 33 are formed of any suitable material as will best serve the purpose and are pivotally connected to the plates 26 through the medium of brackets 34 and pintles 35. The stop latches 33 define ears 36 which are pivotally connected to ears 37 through the medium of pintles 38. These ears 37 are formed as an integral part of latch arms 39 having curved end portions 40 which are adapted to engage edge portions 41 of a fixed block 42.

When the stop latches are disposed in the position illustrated in Fig. 2 with the latch arms disposed with their curved end portions 40 in engagement with the fixed blocks 42 the stop latches are adapted to be engaged by the bumpers 43 of the cars 21 and until the latch arms 39 are released from engagement with the fixed blocks 42 movement of the cars is temporarily suspended.

The means for disengaging the latch arms 39 from fixed blocks 42 includes lifting levers 44 which are pivotally connected as at 45 to the plates 26. These lifting levers have end portions 46 which are disposed beneath the curved end portions 40 and are adapted when pivoted about their pintles 45 to disengage the latch arms from the fixed blocks 42.

The means for pivoting the lifting levers includes a rockably mounted shaft 47 supported for rocking movement by suitable stationary bearing brackets 48 carried by stationary supports 49. This shaft 47 carries spaced collars 50 defining lateral ears 51 to which corresponding end portions of chain members 52 are connected. The opposite corresponding end portions of these chain members are connected to the end portions 53 of the lifting levers 44.

When the lifting lever 47 is rocked in anti-clockwise direction the collars 50 will cause the chain members 52 to pull on the lifting levers 44 and pivot these lifting levers in a clockwise direction to disengage the latch arms from the fixed blocks.

The means for rocking the shaft 47 in an anti-clockwise direction includes a collar 54 carried by the end portion 55 of the shaft 47 and secured thereto by a pin 56. This collar 54 has secured thereto a laterally extending arm 57 which is disposed in the path of a trip arm 58 carried by the cage 23 and secured thereto as at 59 by any suitable securing elements.

When the cage is disposed in loading position the trip arm 58 will engage the arm 57 and rock this arm in anti-clockwise direction. To completely throw the shaft in either direction I operatively associate with the shaft 47 a tensioning spring 60 which has one end portion connected to the trackway 20 and an opposite end portion connected to a lateral projection 62 formed as an integral part of a collar 63 secured to the shaft 47 as at 64.

When the stop latches 33 are engaged by the bumper 43 these stop latches will be yieldably pivoted to dispose themselves in a plan to permit passage of the cars 21 thereover and these stop latches are returned to stopping position through the medium of spring members 65 as best shown in Fig. 2.

The mechanism for rocking the shaft 47 in a clockwise direction includes a rocker arm 66. This rocker arm is disposed contiguous one of the rails 27 and is adapted to be engaged by the flange of one of the wheels of the cars 21. The rocker arm 66 is secured in any suitable manner to a pintle pin 67 which extends through a suitable bracket 68 carried by the trackway 20 and secured to the lower end portion of the pin 67 in any suitable manner is an operating arm 69. The outer end portion 70 of this operating arm is connected to one end portion of a chain member 71 and the opposite end portion of this chain member 71 is connected to a lateral extension 72 of the collar 73 secured to the shaft 47 as at 74 in any suitable manner.

The construction is such that when the rocker arm 66 is engaged by the flange of the wheel the pin 67 will be pivoted and cause the operating arm 69 to exert pull on the chain member 71 which in turn will rock the shaft 47 in a clockwise direction. The shaft rocking in this clockwise direction will dispose the lifting lever 44 in the position illustrated in Fig. 2, it being pointed out that at this point of the operation the springs 65 will have disposed the latch arms in position to arrange their curved end portions 40 in engagement with the fixed locks 42.

From the above description it will be seen that both of the bumpers 33 are operated by a single shaft 47 thus providing mechanism for the purpose which is common to both stop members. It will be further seen that the bumpers are simultaneously disposed in a position to permit passage of the cars 21 and that likewise the bumpers are simultaneously disposed in position to stop movement of the cars.

It will be seen that the mechanism above described is simple in structure and is positive in its operation.

In Figs. 6 to 9 inclusive the mechanism disclosed operates on the same principle as the mechanism illustrated in Figs. 1 and 2 and as previously stated, this mechanism is adapted to control the movement of the cars upon the lifting cage or scale and as the trackway of the cage forms a continuation of the trackway 20 it is manifest that this mechanism can, although not necessarily, be used in conjunction with the mechanism illustrated in Figs. 1 and 2.

In Figs. 3 and 4 I have shown a slightly modified form of construction over that shown in Fig. 1 and in this construction it will be noted that the bumper mechanism is adapted to be operable by a cage generally indicated at 150 and as shown in Fig. 4 this cage includes a trip arm 151 which is adapted to engage a lever 152 pivotally supported by a pintle pin 153 having its end portions journalled in suitable bearing brackets 154. Connected to the end portion 155 of the lever 152 is a connecting rod 156 which has its outer end portion connected as at 157 to a lifting lever 158. This lifting lever 158 is adapted to engage a latch arm 159 having its end portion 160 pivotally connected as at 161 to a bumper member 162. When the bumper member 162 is in an elevated position, or rather generally speaking in car stopping position, the end portion 163 of the latch arm 159 is adapted to detachably engage a latch block 164. When the cage is brought in a position to dispose the trip arm 151 in position to pivot the lever 152 in an anti-clockwise direction the lifting lever 158 will be pivoted about its pivotal support 158' to engage the end portion 165 in position to disengage the latch arm 163 from engagement with the keeper block 164 and this will permit the bumper member 162 to be forced from car stopping position against the action of a spring member 166 which spring member normally retains the bumper member 162 in car stopping position. As shown in Fig. 3 the bumper member 162 is pivotally supported in a manner substantially similar to that disclosed in Fig. 1 and, therefore, reference characters will be used to designate similar parts in this construction.

The lower end portion of the bumper members 162 has an opening 167 formed therein which slidably receives an end portion 168 of an operating rod 169. The end portion 170 of this operating rod has a head formed therein as at 171 and this head is adapted to be engaged by the end portion 172 of the bumper member 162 for reasons hereinafter set forth. The end portion 173 of the operating rod 169 is pivotally connected as at 174 to an arm 175 which is formed as an integral part of a bell crank 176.

Stop members 177 are pivotally connected as at 178 in any suitable manner at points contiguous the outer sides of the rails 179 of a trackway T. These stop members 177 are pivotally associated with the rails 179 whereby they can be pivoted in a position to obstruct travel of a car along the trackway as shown in Fig. 4. This pivotal movement of the stop members is accomplished by connecting the stop members through the medium of connecting links 180 to the bell crank 176.

The operating rod 169 is controlled in its movement in one direction by a spring member 181 which has one end portion (not shown) connected to a stationary support.

After the car 21' has passed from the trackway onto the cage 150 the spring 166 will act upon the bumper member 162 and pivot this bumper member into car stopping position with such force that the end portion 172 of the bumper member 162 will be brought into engagement with the head 171 and move the operating rod in a direction to pivot the stop members 177 from car stopping position to permit the succeeding car 21'' to move into engagement with the bumper 162.

In Figs. 5 to 8 inclusive the mechanism includes a supporting bracket 75 pivotally supporting the stop latch 76 which is adapted to be engaged by the bumpers 43 of the cars 21. Pivotally associated with this stop latch is a latch arm 77 having an end portion 78 which is adapted to engage a fixed block 79. This end portion 78 of the latch arm is adapted to engage an end portion 80 of a lifting lever 81 which is pivotally connected as at 82 to a bracket 83. The stop latch 76 in this instance is likewise returned to its normal position as illustrated in Fig. 6 through the medium of a spring 83'.

Mechanism is provided for pivoting the lifting lever 81 about its pivot 82 to permit the positioning of the end portion 78 of the latch arm 77 into engagement with the fixed block 79. This mechanism includes a rocker arm 84 carried by a pintle pin 85 secured in any approved manner to the cage floor 86'. This rocker arm 84 is disposed contiguous of the rail 86 of the trackway 22 and is likewise adapted to be engaged by a flange of the wheels 87 of the cars 21. The lower end portion of this pintle pin carries an operating arm 88 which has a lateral extension 89 connected to one end portion of a chain member 90. The opposite end portion of this chain member is connected to a link 91 pivotally connected to an arm 92. The arm 92 has a threaded end portion 93 which is connected to a depending projection 94 through the medium of nut members 95. This depending projection 94 is formed as an integral part of a slide bar 96 which is slidably supported by a cage floor 86' through the medium of suitable brackets 97, Fig. 8. This slide bar 97 carries the bracket 83 pivotally supporting the lifting lever 81. The operation thus far is such that when the rocker arm is engaged by the flange of the wheel 87 the pintle pin 85 will be caused to rock the arm 88 in a direction to exert pull on the chain member 90. This chain member 90 will slide the slide bar 96 in the direction of the advance of the cars 21 and when moved in this direction the lifting lever 81 will pivot in a downward direction to dispose its end portion 80 from engagement with the end portion 78 permitting the end portion 78 to engage the fixed block 79 to retain the stop gage the stop latch 76 in the position illustrated in Fig. 6.

Within the cage well W is arranged a knock-off stud 98 disposed in the path of the end portion 99 of the lifting lever when said lifting lever is disposed with its end portion 80 in engagement with the end portion 79. When the cage 23 arrives at the bottom of the well W the stud 98 will engage the portion 99 of the lifting lever 81 and pivot this lifting lever in a direction to cause the end portion 80 to bear against the end portion 79 of the latch arm 77 and disengage the end portion 78 from engagement with the fixed block 29 thus permitting the stop latch to be disposed in a position to permit passage of the car 21 thereover. After this car 21 has left the trackway of the cage 23 the succeeding car is now ready to be moved onto the trackway of the cage 23 and in this movement of the succeeding car the rocker arm 84 will be engaged by the flange of the wheel 87 and cause the operating arm 88 to be rocked for the reasons above outlined.

From this description it will be manifest that I likewise provide a simple combination and arrangement of parts to permit the feeding and discharge of mining cars from a cage and I wish at this time to say that the mechanism can be embodied with a rotary dump well known in the art without departing from the spirit of the invention.

In Fig. 9 I have illustrated the mechanism as shown in Figs. 1 and 2 incorporated with stop mechanism disclosed in my application filed in the United States Patent Office on or about March 5, 1926, Serial No. 92,522, and in this mechanism there are included stops 100 arranged for rolling movement into the path of the wheels of the mining cars 21 to stop movement of these cars and to hold the same until they are ready for movement into engagement with the bumpers 33. This construction is well known and fully described in my U. S. application above mentioned and need not be further described in detail with the exception that the links 4' which control operation of the stops 100 are operatively connected to the shaft 47 through the medium of a collar 5'.

In Fig. 10 I have illustrated my improved mechanism associated with what is known in the art as a kickback dump comprising a trackway 101 over which the empty cars are adapted to pass to the loading station and the trackway 102 over which the loaded cars are adapted to pass when permitted to do so by my controlling mechanism.

In this instance as shown in Fig. 10 the empty cars control the successive movement of the loaded cars and to accomplish this a collar 103 is secured to the shaft 47 as at 104 and this collar 103 defines a lateral extension 105 to which is pivotally connected an arm 106 of a collar 107 fixed as at 108 to a rocker shaft 109. This shaft 109 is supported for rockable movement by suitable bearing brackets 110 and the end portion 111 of this shaft 109 has secured thereto the trip mechanism 112 which is of a well known construction and need not be further described in detail with the exception of stating that when the trip arm 112 is engaged by the mining car the shaft 109 will be rocked and impart rockable movement to the shaft in opposite directions for the purposes herein set forth.

In Figs. 11 to 15 inclusive I wish to call attention to various forms of stop latches which may be used in conjunction with my improved mechanism and, as will be hereinafter understood, any one of these stop latches may be substituted for either the stop latch 33 or 76, and their associated parts without departing from the spirit of the invention. A brief description with reference to each of these modified forms of stop latches will be briefly outlined and at this time it is pointed out that the operation of the shaft 47 and its associated parts is substantially similar to that herein described.

In Fig. 11 the bumper 113 is pivotally connected as at 114 to a bearing bracket 115. The bumper 113 has a laterally extended portion 116 to which an end portion of the latch 117 is connected as at 118. This latch is of elbow construction comprising links 119 and 120 pivotally connected together as at 121. The link 120 is pivotally connected by a pin 122 to a bracket 123. This pin 122 has fixed thereto a link 124 to which an end portion of the spring 65 is connected, said spring functioning to retain the latch in operative position.

The adjacent ends 125 of the links 119 and 120, which have pivotal connection, when in operative position rest upon a supporting block 126 and when in such position it will be seen that their pivot connection is below the line of alignment between these links thus preventing self pivotal movement of the links 119 and 120 by the weight of the bumper member 113. The lifting lever 44 in this instance has an end portion 127 which engages beneath the pivotal connection 121 and when pulled downwardly this end portion 127 will act upon the pivotal connection to throw the pivotal connection in an upward direction permitting the bumper 113 to pivot from car stopping position. The lifting lever 44 is held in its normal position through the medium of a spring member 128.

In Fig. 12 I have shown a slightly modified form of construction over that shown in Fig. 11 and in this form of construction the lifting lever 44 is dispensed with and substituted therefor is a slide plate 129 which, when in its normal position, is disposed beneath and in engagement with a tail portion 130 of the link 120. The links 119 and 120 are normally held with their pivotal connection in bearing relation with respect to the fixed block 126 through the medium of the spring member 127. The operation of this construction is such that when the plate 129 is moved to the left the tail portion 130 will be released to permit the pivotal connection 121 to pivot in an upward direction to allow the bumper member 113 to be disposed from car bumping position.

In Fig. 13 the form of construction shown in this figure embodies the bumper 131. In this form of construction it will be seen that I dispense with the links 120 and 119 and substitute therefor the bumper member 131 which has a lateral segmental portion 132 normally supported by the slide plate 129. When the slide plate 129 is moved to the right the segmental portion 132 of the bumper member 131 will be permitted by its weight to pivot the bumper member 131 from car stopping position.

In Fig. 14 the structure includes the bumper member 113 which has pivotally connected thereto as at 118 the latch 133. The latch 133 has its outer end portion 134 normally disposed when the bumper member 113 is in car stopping position in engagement with the fixed stop block 135. The lifting lever in this form of construction includes an end portion 136 which pivotally carries a trip finger 137 which is adapted to engage the end portion 134 when the lifting lever 44 is pivoted about its pivot 138. When the lever 44 is pivoted about its pivot the trip finger 137 will engage the end portion 134 and disengage the latch 133 from the stop block 135 and permit the bumper member 113 to pivot from car stopping position against the action of the spring 65.

In Figs. 15 and 16 it will be seen that the latch 139 is pivotally connected as at 140 to a bearing block 141. The inner end portion 142 of this latch 139 is adapted to engage beneath a lip 143 provided by the bumper member 113. The latch 139 has formed as an integral part thereof an ear 144 to which one end portion of the trip mechanism is adapted to be attached. The bumper member 113 in this instance has a recess 113' formed therein for the passage of the inner end portion of the latch 139. The trip mechanism is adapted to pull down upon the latch 139 and pivot the same about its pivot 140. This downward pulling movement disposes the inner end portion of the latch 139 in a position for passage through the recess 133' as the bumper member 113 pivots from car stopping position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a device of the class described, the combination with a trackway, and cars adapted for movement along said trackway, of a bumper structure disposed between the rails of the trackway, said bumper structure including a pivotally supported bumper, means for releasably holding said bumper in the path of movement of the cars, means for disengaging said holding means to permit said bumper to pivot by movement of the cars from bumping position, and means operable on said bumper structure for resetting the bumper in the path of movement of the cars.

2. In a device of the class described, the combination with a trackway and cars movable along said trackway, of a bumper structure including a bumper disposed in the path of movement of the cars, said bumper structure including a latch arm pivotally connected to said bumper and a fixed block adapted for engagement with the outer end portion of the latch arm for holding said bumper in position to be engaged by said cars, and means operable on said latch arm for disengaging said latch arm from said fixed block.

3. In a device of the class described, the combination with a trackway and cars movable along said trackway, of a bumper structure including a bumper disposed in the path of movement of the cars, said bumper structure including a latch arm pivotally connected to said bumper and a fixed block adapted for engagement with the outer end portion of the latch arm for holding said bumper in position to be engaged by said cars, means operable on said latch arm for disengaging said latch arm from said fixed block, and means operable by movement of the cars for resetting said disengaging means.

4. In a device of the class described, the combination with a trackway and cars movable along said trackway, of a bumper structure including a bumper disposed in the path of movement of the cars, said bumper structure including a latch arm pivotally connected to said bumper and a fixed block adapted for engagement with the outer end portion of the latch arm for holding said bumper in position to be engaged by said cars, means operable on said latch arm for disengaging said latch arm from said fixed block, and means operable by movement of the cars for resetting said disengaging means, said last mentioned means including a pivotally mounted member adapted to be engaged by the wheels of the car, a pivotally mounted lifting lever having an end portion adapted for engagement with the outer end portion of the latch arm and means operably connecting the lifting lever to said member whereby said lifting lever will be pivoted by pivotal movement of said member.

5. In a device of the class described, the combination with a trackway, of a plate disposed between the rails of the trackway, means yieldably associating the plate with the rails for limited slidable movement relative to the rails, a bumper structure carried by said plate, said bumper structure including a pivotally mounted bumper member having a latch-arm pivotally connected thereto, means releasably engaging said latch arm for holding said bumper member in the path of cars movable along said trackway, and means operable on said holding means for permitting said bumper member to be disposed from the path of movement of the cars.

6. In a device of the class described, the combination with a trackway, of a plate disposed between the rails of the trackway, means yieldably associating the plate with the rails for limited slidable movement relative to the rails, a bumper structure carried by said plate, said bumper structure including a pivotally mounted bumper member and means for releasably holding said bumper member in the path of cars movable along said trackway, and means operable on said holding means for permitting said bumper member to be disposed from the path of movement of the cars, said last mentioned means including a lifting lever pivotally associated with the plate, a rockable shaft, means for rocking said shaft and a member operatively connecting the shaft to the lifting lever whereby when said shaft is rocked in an anti-clockwise direction said lifting lever will be moved into engagement with said holding means for releasing said holding means to permit said bumper member to be disposed in said position from the path of movement of the cars.

7. The combination with a trackway, stop members movable into and out of car holding position relative to the trackway, a bumper structure disposed between the rails of the trackway, said bumper structure including a pivotally mounted bumper member adapted for engagement with a portion of a car travelling along said trackway, means for retaining said bumper in car engaging position, a latch arm pivotally associated with the bumper member, adapted to release said bumper from said retaining means, and means for simultaneously operating said latch arm and said stop members to permit said bumper member and said stop members to be moved into and out of car holding position.

8. In a device of the class described, the combination with a trackway and a cage having a trackway adapted to be disposed to receive cars from the first mentioned trackway, a bumper structure movable into and out of the path of movement of the cars as they pass along said first mentioned trackway, means for releasing said bumper structure to permit said movement of said bumper structure, a bumper structure disposed between the rails of the second mentioned trackway, said second mentioned bumper structure including a bumper member, a latch arm pivotally associated with the bumper member, a member carried by the floor of the cage for retaining said latch arm in a position to hold said bumper member in the path of movement of the cars on said second mentioned trackway, and means operable on said latch arm for disengaging said latch arm from said member to permit the bumper member to pivot from the path of movement of said cars, said last mentioned means including a pivotally mounted lifting lever adapted to be engaged by an operating stud when said cage is lowered into loading position.

9. In a device of the class described, the combination with a trackway and a cage having a trackway adapted to be disposed to receive cars from the first mentioned trackway, a bumper structure movable into and out of the path of movement of the cars as they pass along said first mentioned trackway, means for releasing said bumper structure to permit said movement of said bumper structure, a bumper structure disposed between the rails of the second mentioned trackway, said second mentioned bumper structure including a bumper member, a latch arm pivotally associated with the bumper member, a member carried by the floor of the cage for retaining said latch arm in a position to hold said bumper member in the path of movement of the cars on said second mentioned trackway, and means operable on said latch arm for disengaging said latch arm from said member to permit the bumper member to pivot from the path of movement of said cars, said last mentioned means including a pivotally mounted lifting lever adapted to be engaged by an operating stud when said cage is lowered into loading position, and means operable by movement of the cars for resetting said lifting lever in position to disengage the latch arm from said member.

10. A structure of the class described, the combination with two parallel rails of a trackway, of a plate disposed between the rails, means operatively connecting the plate to the rails for limited slidable movement longitudinally of the rails, a bumper member, means pivotally connecting the bumper member to the plate, a latch arm, means pivotally connecting the latch arm to the bumper member, a fixed block carried by the plate, said latch arm having an end portion adapted to detachably engage an edge portion of the fixed block, a lifting lever pivotally connected to the plate and having an end portion disposed in engagement with said end portion of the latch arm, a rockable shaft, means operatively connecting the rockable shaft to the lifting lever whereby when said rockable shaft is rocked in one direction said lifting lever will be pivoted to disengage the latch arm from said fixed plate, and means operable by a cage for rocking said rockable shaft.

11. A structure of the class described, the combination with two parallel rails of a trackway, of a plate disposed between the rails, means operatively connecting the plate to the rails for limited slidable movement longitudinally of the rails, a bumper member, means pivotally connecting the bumper member to the plate, a latch arm, means pivotally connecting the latch arm to the bumper member, a fixed block carried by the plate, said latch arm having an end portion adapted to detachably engage an edge portion of the fixed block, a lifting lever pivotally connected to the plate and having an end portion disposed in engagement with said end portion of the latch arm, a rockable shaft, means operatively connecting the rockable shaft to the lifting lever whereby when said rockable shaft is rocked in one direction said lifting lever will be pivoted to disengage the latch arm from said fixed plate, means operable by a cage for rocking said rockable shaft, and means for rocking said rockable shaft in an opposite direction, said means including a rockable arm disposed adjacent one of the rails and adapted to be engaged by a wheel of a car moving along said rails, and means operatively connecting the rockable arm to the rockable shaft.

12. In a device of the class described, the combination of two rails of a trackway, a plate disposed between the rails, a bumper member, means pivotally connecting said bumper member to said plate, means for detachably holding said bumper member in car stopping position, means operable on said holding means adapted to permit pivotal movement of said bumper in one direction, the weight of cars on said trackway causing said pivotal movement, and resilient means for resisting pivotal movement of said bumper member and for returning said bumper member to car stopping position.

13. In a structure of the class described, the combination with two rails of the trackway, a plate disposed between the rails, a bumper member, means pivotally connecting the bumper member to the plate, said bumper member being adapted to pivot in one direction by movement of a car along said rails, resilient means for resisting pivotal movement of said bumper member and for returning said bumper member to car stopping position, a latch arm having one end portion pivotally connected to the bumper member, a fixed plate carried by said first mentioned plate, said latch arm having its outer end portion adapted to detachably engage an edge portion of said fixed plate, and means operable on said latch arm for permitting said bumper member to pivot in said one direction.

14. A bumper structure including a plate, a bumper member pivotally carried by the plate and normally disposed in stopping position with respect to an object passing over said plate, a latch arm having one end portion pivotally connected to the bumper member, a fixed plate carried by the first mentioned plate, said latch arm having its outer end portion adapted for detachable engagement with an edge portion of the fixed plate, and means adapted for operation of said outer end portion for disengaging said latch arm from said edge portion.

15. A bumper structure including a plate, a bumper member pivotally carried by the plate and normally disposed in stopping position with respect to an object passing over said plate, a latch arm having one end portion pivotally connected to the bumper member, a fixed plate carried by the first mentioned plate, said latch arm having its outer end portion adapted for detachable engagement with an edge portion of the fixed plate, a lifting lever pivotally carried by the plate and having an end portion normally engaging the outer end portion of the latch arm and adapted to operate on said outer end portion to disengage said outer end portion from said edge, and means for operating said lifting lever.

16. A bumper structure including a plate, a bumper member pivotally carried by the plate and normally retained in stopping position with respect to an object adapted to move over said plate, said bumper member being adapted to pivot in one direction by movement of said object, means for resisting pivotal movement of said bumper member in said direction and for returning said bumper member into stopping position, and means for releasably retaining said bumper member in stopping position, said last mentioned means including a latch arm pivotally connected to the bumper member, a member carried by the plate and engaging an end portion of said latch member, and means operable on said latch member for disengaging said end portion from said plate.

17. A bumper structure including a plate, a bumper member pivotally carried by the plate and normally retained in stopping position with respect to an object adapted to move over said plate, said bumper member being adapted to pivot in one direction by movement of said object, means for resisting pivotal movement of said bumper member in said direction and for returning said bumper member into stopping position, means for releasably retaining said bumper member in stopping position, said means including a latch arm pivotally connected to the bumper member, a member carried by the plate and engaging an end portion of said latch member, and means operable on said latch member for disengaging said end portion from said plate, said last mentioned means including a lifting lever pivotally carried by the plate and having an end portion adapted to operate on said latch arm for disengaging said latch arm from said member, and means for operating said lifting lever.

18. In a device of the class described, the combination with a trackway, and cars adapted for movement along said trackway, of a bumper structure disposed between the rails of the trackway, said bumper structure including a pivotally supported bumper, means for holding said bumper in the path of movement of the cars, means for releasing said bumper from said holding means, the weight of said cars moving said bumper from bumping position and other means controlled by the movement of said cars for returning said bumper to car retaining position.

19. A device of the class described including, in combination, a trackway, a structure having a trackway thereon adapted to receive cars from said first mentioned trackway, and bumper means adapted to control the travel of said cars from said trackway to said structure, a retaining means adapted to be engaged by said bumper means carried by said trackway, said bumper means comprising a pivotally mounted portion and another portion adapted to engage said retaining means, and a latch mechanism for releasing said portion from said retaining means operated by the movement of said structure.

20. A device of the class described including, in combination, a trackway, a structure having a trackway thereon adapted to receive cars from said first mentioned trackway, a plate disposed between the rails of said first mentioned trackway, means yieldably associating the plate with the rails for limited slidable movement relative to said rails, bumper means carried by said plate adapted to engage and retain cars on said trackway, retaining means for said bumper means carried by said plate, said bumper means comprising a pivotally mounted bumper portion and a portion adapted to engage said retaining means, and a latch mechanism for releasing said portion from said retaining means operated by the movement of said structure 21. A device of the class described including, in combination, a trackway, a structure having a trackway thereon adapted to receive cars from said first mentioned trackway, a plate disposed between the rails of said first mentioned trackway, means yieldably associating the plate with the rails for limited slidable movement relative to said rails, bumper means carried by said plate adapted to engage and retain cars on said trackway, retaining means for said bumper means carried by said plate, said bumper means comprising a pivotally mounted bumper portion and a portion adapted to engage said retaining means, a latch mechanism for releasing said portion from said retaining means operated by the movement of said structure, and means for returning said portion to engagement with said retaining means operated by the movement of cars along said trackway.

22. A device of the class described including, in combination, a trackway, a structure having a trackway thereon adapted to receive cars from said first mentioned trackway, and bumper means adapted to control the travel of said cars along said trackway and on said structure, certain of said bumper means being mounted between the rails of said first mentioned trackway and certain of said bumper means being mounted between the rails of said trackway on said structure, said bumper means being arranged for simultaneous operation and embodying a pivotally mounted bumper portion and a portion adapted to engage retaining means, said retaining means being carried by said trackway, and a latch structure for releasing said portions from said retaining means operated by the movement of said structure.

In testimony whereof I affix my signature.

GLENN W. MERRITT.